United States Patent [19]

Suzuki

[11] Patent Number: 5,215,862
[45] Date of Patent: Jun. 1, 1993

[54] RECORDING MEDIUM FOR INFORMATION

[75] Inventor: Katsumi Suzuki, Tokyo, Japan

[73] Assignee: Kabushiki Kaisha Toshiba, Kawasaki, Japan

[21] Appl. No.: 646,830

[22] Filed: Jan. 28, 1991

[30] Foreign Application Priority Data

Jan. 31, 1990 [JP] Japan .................. 2-20806

[51] Int. Cl.$^5$ ............................ G03C 1/72; G11B 7/24
[52] U.S. Cl. ............................... 430/270; 430/19; 430/495; 430/945; 346/135.1
[58] Field of Search ........... 430/19, 270, 495, 346, 430/945; 346/135.1

[56] References Cited

U.S. PATENT DOCUMENTS

| | | | |
|---|---|---|---|
| 3,530,441 | 9/1970 | Ovshinsky | 340/173 |
| 4,647,944 | 3/1987 | Gravesteijn et al. | 346/1.1 |
| 4,889,746 | 12/1989 | Utsumi et al. | |

FOREIGN PATENT DOCUMENTS

| | | |
|---|---|---|
| 0184452 | 6/1986 | European Pat. Off. |
| 0286406 | 10/1988 | European Pat. Off. |
| 0319037 | 6/1989 | European Pat. Off. |

OTHER PUBLICATIONS

Abstract, J60/34897 Feb. 1985 Asano et al.
Erasibe-Optical Disk of Phase Transition Type (3) 18p-ZP-8, Meeting of the Applied Physics Society, 1987.

Primary Examiner—Lee C. Wright
Attorney, Agent, or Firm—Foley & Lardner

[57] ABSTRACT

A recording medium for information comprising a substrate, a recording layer provided on the substrate, in which crystalline phases and amorphous phases are reversibly created in accordance with irradiation energy of a light beam irradiated onto the recording layer, wherein the recording layer includes a ternary alloy having the same composition as an alloy of InTe and $In_{50-X/2}Sb_{50-X/2}Te_X$ (where X satisfies $20 \leq X \leq 45$), i.e., $$\{In_{(100-y)/200}Sb_{(100-y)/200}Te_{y/100}\}_{100-z}In_{z/2}Te_{z/2}$$

wherein
$25 \leq y \leq 45$ atom %, and
$0 < z \leq 80$ atom %, with the proviso that $0 < z \leq 60$ atom % when $y > 40$ atom % or $y < 30$ atom %.

8 Claims, 3 Drawing Sheets

FIG.1

LASER BEAM

RECORDING MEDIUM FOR INFORMATION

BACKGROUND OF THE INVENTION

1. Field of the Invention

The present invention relates to a recording medium for information having a recording layer in which crystalline phases and amorphous phases are able to be formed alternately and reversibly at predetermined intervals by irradiating light beams such as laser beams with alternately changing irradiation conditions thereof, and from which information once recorded can be retrieved by utilizing the difference in intensity between light signals reflected at these different phases formed in the recording layer respectively.

2. Description of the Background Art

Conventionally, phase change type materials whose light reflectance depends on solid phases are known as an optical disc material capable of storing information at a high density and erasing and writing information as desired.

Said phase change type material has a specific characteristic. Thus, portions in the material irradiated by the laser beams are reversibly changed between the different phases when laser beams are irradiated onto the material with changed irradiation conditions thereof, for example irradiation energy, irradiation intensity or irradiation pulse width of time.

For example, the phase change type materials having said characteristic include semiconductors such as tellurium (Te) and germanium (Ge), alloy TeGe, InSe which is an alloy of indium (In) and selenium (Se), SbSe consisting of antimony (Sb) and selenium (Se), SbTe consisting of antimony and tellurium, and intermetallic compounds.

When this type of material is irradiated by a laser beam, a crystalline phase or an amorphous phase is formed at the irradiation portion of the material in accordance with the irradiation condition. These two phases have different complex refractive indexes $N = n(1 - ik)$ (where n is a refractive index and k is an absorption index). Namely, since not only the refractive indexes n of these two phases but also the absorption indexes k thereof are different from each other, the values of light reflectance of these phases are also different from each other.

Thus, it has been proposed to use the material having such a characteristic as an optical memory capable of erasing and writing information by S.R. Ovshinsky et al. (Metallurgical Transactions 2 641 (1971).

According to this proposition, a disc which interposes a recording layer comprising the material as mentioned above is rotated, and a laser beam is irradiated onto the disc with alternately changed irradiation conditions thereof to reversibly form a predetermined pattern in which crystalline phases and amorphous phases are arranged alternately. Then, a laser beam for reading-out having much smaller irradiation energy is successively irradiated onto the crystalline phases and amorphous phases of the recording layer. The irradiated laser beam for reading-out is reflected by a reflecting layer optionally provided behind the recording layer after passing through its layer. Thereafter, the reflected laser beam for reading-out is converted into a reading-out signal by a suitable photoelectric converter, and intensity of the laser beams passed through the different phases having specific light reflectance respectively are measured respectively. Namely, information showed by the phase pattern can be read out by discriminating the states of the phases by utilizing the difference in light reflectance.

In more detail, when some information is recorded in the recording layer formed with the material as mentioned above, a laser beam having a power high enough to heat the recording layer over the melting point thereof and having a short pulse width is irradiated onto the recording layer. Thus the recording layer is melted by the laser beam. Then, portions in the recording layer irradiated by the beam are quenched immediately to provide a recording mark being the amorphous phase at each of the portions. When information, that is, the phase pattern as mentioned above once recorded in the recording layer is erased, a laser beam having energy enough to heat the layer to a desired temperature exceeding the temperature for crystallization thereof and being lower than the melting point and having a relatively long pulse width is irradiated onto the recording layer. Then, portions in the recording layer irradiated by the beam are cooled down gradually to change all of the recording layer including the amorphous phases into a crystalline phase. Namely, the recording marks are erased.

In the manner of storing and erasing information, a so-called two beam method is adopted, in which a first laser beam having a circular spot for changing portions irradiated by the beam to the amorphous phases by melting and quenching and another laser beam having an elliptical spot for changing portions irradiated by the beam to the crystalline phase by cooling down gradually are used alternately and independently.

However, the two beam method requires a complicated optical system for irradiating these laser beams. Particularly, it is difficult to control the laser beam having an elliptical spot and a circular spot to follow a spiral track in a disc. In other words it is difficult to arrange those spots in a same track.

As a result, a so-called one beam method in which the storing and erasing of information are carried out by one laser beam has been studied.

In the one beam method, since a source of a laser beam which follows the track in the disc is single, the so-called overwrite, that is, erasing information already recorded in the recording layer and reading new information, can be easily carried out.

To be concrete, a power-changeable single laser beam source is used in the method, and a laser beam for erasing having a power level of Pe and another laser beam for recording having a power level of Pw (Pe < Pw) are irradiated alternately at predetermined intervals onto the recording layer in which information is already recorded. As a result, new information is read in the recording layer and old information is erased.

The method for carrying out the overwrite by using a single laser beam source is called the one beam overwrite method, and does not require such a complicated servo system as required in the two beam method, thus the laser beam can be easily positioned.

However, the one beam overwrite method also has problems when it is adopted in the phase change type recording layer.

Namely, since the rotation speed of the disc is constant, the moving speed of the laser beam irradiated onto the recording layer to form amorphous phases or crystalline phases therein becomes constant. In other words, the irradiation time of the laser beam onto each specific portion of the recording layer is constant irrespectively of a kind of phase to be formed at the portion, and the conditions for discharging heat generated by the beam from the recording layer is the same irrespectively of a kind of phase to be formed therein. Therefore, whether a portion of the recording layer irradiated by the laser beam becomes the amorphous phase or crystalline phase depends only on the amount of power of the laser beam.

Accordingly, since it is necessary to carry out the crystallization in such a short time as required in forming the amorphous phases, it is difficult to complete the crystallization by taking enough time for cooling down for erasing information.

Moreover, when information is recorded, it is difficult to change the end portions of the recording mark to be provided into the amorphous phase. Namely, when the recording mark in the amorphous phase is provided, portions adjacent to the recording mark are heated up by the laser beam for erasing just before and immediately after the formation of the mark. Thus, the end portions of the recording mark can not be quenched immediately for the heat.

As a result, amorphous phases and crystalline phases can not be formed at predetermined intervals alternately. This causes wrong retrieval of information.

An alloy material comprising indium (In), antimony (Sb) and tellurium (Te) has been noted recently. That is, the phase change type recording layer consisting of the material allows the one beam overwrite method to be applied. Moreover, the application of the one beam overwrite method is enabled by selecting a composition of the alloy material suitably.

Namely, according to experiments done by the inventor of this invention, by using an alloy material formed by adding tellurium to a compound InSb by 20 to 45 atom %, in other words, an alloy material having a composition represented by $In_{50-X/2}Sb_{50-X/2}Te_X$ ($20 \leq X \leq 45$) comprising Te of X atom %, In of $50-X/2$ atom %, and Sb of $50-X/2$ atom % as a recording layer, a material having a rapid crystallizing characteristics of the intermetallic compound InSb and an easy amorphous characteristics of tellurium can be obtained. Namely, this alloy material can satisfy the necessity to carry out the crystallization in a short time and to form amorphous phases without quenching immediately, which are problems in the one beam overwrite method.

Moreover, since the alloy material changes to the amorphous state easily, it can change to the amorphous state even when the power of the laser beam for recording is considerably reduced. Therefore, it is possible to make the optical system for irradiating the laser beam in a small scale, thus an recording medium for information comprising the alloy material can be manufactured at low cost. Moreover, the recording medium for information can be handled easily.

However, since the recording layer having the composition represented by $In_{50-X/2}Sb_{50-X/2}Te_X$ is an alloy, the interatomic bonding power is weak and the composition is not so stable. Accordingly, when melting and quenching the recording layer are repeated in the overwrite operation, the composition of the alloy at portions subjected to the overwrite treatment changes gradually, that is, generates a segregation, and the rapid crystallizing characteristic and easy amorphous characteristic of the recording layer are deteriorated.

On the contrary, InTe which is a compositionally stable compound, is now considered as a material useful as recording layer.

Namely, when InTe is used as a material for the recording layer, each amorphous phase to be formed by irradiation of a laser beam for recording is stable. Hereinafter, this is called amorphous stable characteristic. Moreover, the recording layer has a characteristic to be easily changed into amorphous phases even when heat of a laser beam for erasing remains in the recording layer.

Moreover, since InTe is a compound, the segregation of recording layer does not occur even when the overwrite operation to the recording layer is repeated. Thus, the amorphous stable characteristic and easy amorphous characteristic are not deteriorated.

However, since InTe has a characteristic to be a small absorption index to a laser beam (for example, a semiconductor laser beam has a wavelength of 830 nm), a great beam power, i.e., 20 to 25 mW at the surface of a disc is required when amorphous phases are formed in the material by using a laser beam for recording which requires the highest power. A laser beam having about 14 mW is required to form amorphous phases in the alloy of $In_{50-X/2}Sb_{50-X/2}Te_X$.

Accordingly, when InTe is used as a material of the recording layer, an optical system for irradiating a laser beam must be in a large scale, thus manufacture of the recording medium for information requires a large cost. Moreover, the recording medium for information can not be handled easily.

SUMMARY OF THE INVENTION

The present invention was invented to solve the problems of the prior art as mentioned above, therefore it is an object thereof to provide a recording medium for information which requires no complicated servo mechanism and can use a low-power laser beam, and shows an excellent overwrite characteristic represented by the rapid crystallizing characteristic and easy amorphous characteristic, further the overwrite characteristic is not deteriorated even when the material is repeatedly subjected to the overwrite operation.

Accordingly, a recording medium for information of the present invention for solving the problems includes a substrate and a recording layer provided thereon in which crystalline phases and amorphous phases are reversibly changed in accordance with conditions of irradiation energy of a laser beam when the laser beam is irradiated onto the recording layer, and the recording layer comprises a ternary alloy of the same composition as an alloy of InTe and $In_{50-X/2}Sb_{50-X/2}Te_X$ (wherein X satisfies $20 \leq X \leq 45$), where the InTe compound ranges from above 0 atom % to 60 atom %.

Since the recording medium for information of the present invention comprises a ternary alloy comprising indium, antimony and tellurium at the above-mentioned compositional ratio, even when the recording layer is irradiated by a laser beam having relatively low power, the rapid crystallizing characteristic and easy amorphous characteristic of $In_{50-X/2}Sb_{50-X/2}Te_X$ can be utilized as well as the stability of amorphous phases can be enhanced by InTe.

Moreover, since InTe is a stable component, compositional change of the ternary alloy composing the recording layer does not occur even when the recording layer is repeatedly subjected to the overwrite operation.

In the overwrite operation, the compositionally stable compound InTe is included in the alloy $In_{50-X/2}Sb_{50-X/2}Te_X$ when the recording layer is quenched after melting, then crystal growth of the compound which composes the recording layer is generated between the alloys as nuclei of crystals. Thus, atomic exchange which would occur among compositionally unstable alloys can be prevented. Namely, the segregation is not seen in the recording layer.

Accordingly, even when the recording layer is irradiated alternately by laser beams different in condition for the overwrite operation, and crystalline phases and amorphous phases are formed at a predetermined length alternately and reversibly, the complex refractive indexes $N=n(1-ik)$ (wherein, n is a refractive index and k is an absorption index) of these phases are always stable for crystalline and amorphous phases respectively.

This means that even when the recording layer is repeatedly subjected to the overwrite operation, each light reflectance of light signals reflected at these phases is always stable in no relation to the overwrite operation. In other words signal intensity obtained from the difference in the reflectance of laser beams between the crystalline and amorphous phases is not changed. Accordingly, a phase pattern formed in the recording layer can always be correctly known from the difference in the reflectance between the light signals respectively reflected at the phases.

DESCRIPTION OF THE SPECIFIC EMBODIMENTS

Hereinafter, an embodiment of the present invention will be described with reference to the accompanying drawings.

Figure 1:
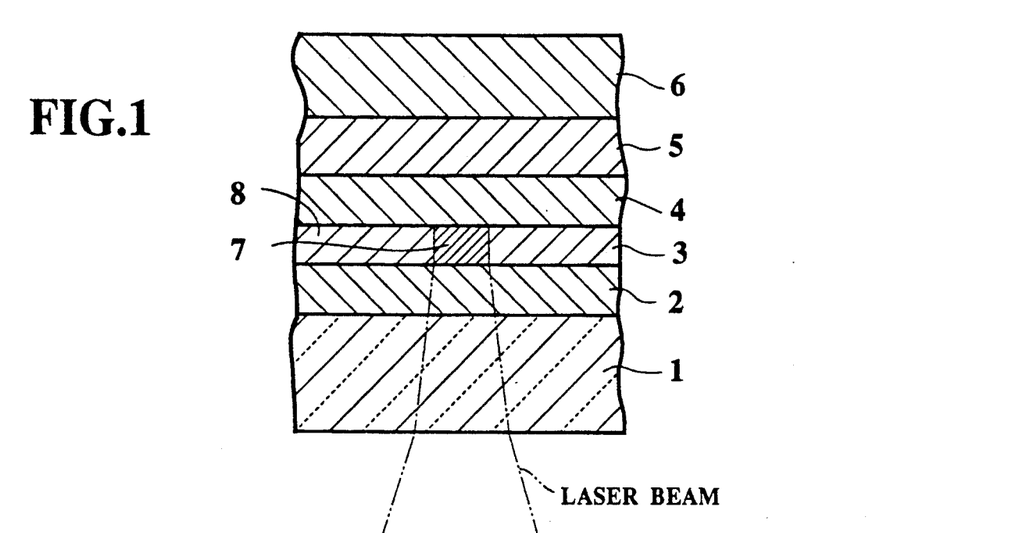
FIG. 1 is a cross section of a recording medium for information according to an embodiment of the present invention.

FIG. 1 is a cross section of a recording medium for information according to one embodiment of the present invention.

As shown in FIG. 1, the recording medium for information according to this embodiment comprises a substrate 1 through which laser beams for recording, erasing and reading-out are transmitted, a protective layer 2 which is thermally stable and provided on the substrate 1, a recording layer 3 which is provided on the protective layer 2 and records information, a protective layer 4 which is provided on the recording layer 3 and seals up and protects the recording layer 3 by cooperating with the protective layer 2, a reflecting layer 5 which is laminated on the protective layer 4 and reflects the laser beam for reading-out, and a resin layer 6 provided on the reflecting layer 5.

The substrate 1 is a disc substrate of 5 inch diameter made of polycarbonate, which is a material that experiences little change with time, and has a thickness of 1.2 mm.

It is also possible to use polymethyl methacrylate (PMMA) or glass as material of the substrate 1.

The recording layer 3 is a ternary alloy consisting of indium (In), antimony (Sb) and tellurium (Te), and has a thickness of 200 Å. Moreover, the ternary alloy has the same composition as obtained by combination of a compound of InTe and tellurium of X atom %, indium of 50−X/2 atom % and antimony of 50−X/2 atom %, i.e., $In_{50-X/2}Te_X$ (wherein X satisfies $20 \leq X \leq 45$) at a predetermined ratio as mentioned below.

The recording layer 3 comprising the ternary alloy is heated to a temperature above its melting point (600° to 700°C.) when irradiated by a laser beam having a predetermined power level, then cools into the amorphous state after discharging heat to the protective layers 2, 4. In such a manner, an amorphous phase 7 is formed in the recording layer 3.

The recording layer 3 is heated to a temperature exceeding its crystallization temperature (200° to 350° C.) by a laser beam if it is desired to erase the stored information. The layer 3 then is crystallized after discharging heat of the laser beam to the protective layers 2, 4. In such a manner, a crystalline phase 8 is formed in the recording layer 3.

The thickness of the recording layer 3 is in the range of from 50 to 2000 Å, preferably 100 to 1000 Å.

The protective layers 2, 4 consist of aluminium oxide ($Al_2O_3$), and are a dielectric substance respectively having a thickness of 1000 Å and are thermally stable (their melting point is about 1300° C.). Moreover, these protective layers 2, 4 transmit a laser beam, and protect the recording layer 3 interposed therebetween. Namely, since the protective layers 2, 4 which are stable against heat seal up the recording layer 3 interposed therebetween, cavity portions which would be generated by vaporization of portions irradiated by the laser beam can be avoided when the laser beam for recording or erasing is irradiated to the recording layer 3.

Furthermore, these protective layers 2, 4 have a suitable thermal conductivity (in this embodiment, it is about 4.5 pJ/μm·μs·°C.) for heating the recording layer 3 irradiated by the laser beam at a temperature exceeding the melting point or the crystallization temperature thereof, then forming the amorphous phase or the crystalline phase after discharging heat. Namely, the layers 2, 4 absorb heat suitably from the recording layer 3 heated by the laser beam.

Moreover, part of the laser beam for reading-out is reflected by the recording layer 3, and the remaining laser beam is reflected by the reflecting layer 5. The two reflected beams then emerge from the substrate 1. The laser beam reflected by the reflecting layer 5 interferes with the laser beam reflected by the recording layer 3 after passing through an optical transmission distance defined by the protective layer 4 (in this embodiment, the refractive index n is 1.6), so that the two reflected laser beam are enhanced. Thus, an intensity measurement of the reflected laser beam can be easily carried out.

The thickness of the protective layers 2, 4 is in the range of from 100 to 3000 Å, preferably 500 to 1500 Å.

The protective layers 2, 4 may be formed of $Ta_2O_5$, ZnS, $SiO_2$, $TiO_2$, $Si_3N_4$, SiAlON, AlN, a mixed layer of ZnS and $SiO_2$, or $ZrO_2$.

The reflecting layer 5 comprises a thin film of gold (Au) having a thickness of 1000 Å in this embodiment.

Incidentally, the thickness of the reflecting layer 5 is in the range of from 20 to 10000 Å, preferably 200 to 2000 Å.

The reflecting layer 5 may be formed of Al, NiCr, and Al alloy, Pt or a Ni alloy.

The resin layer 6 comprises an ultraviolet-curing resin having a thickness of 10 $\mu$m, and prevents scratching on the surface of the recording medium.

The thickness of the resin layer 6 is in the range of from 0.5 to 30 $\mu$m, preferably 2 to 10 $\mu$m.

Next, a method of producing the recording medium according to this embodiment will be described.

The substrate 1 is placed in a vacuum chamber of a sputtering apparatus having a target. Then, the chamber is kept at a high vacuum by a suitable vacuum apparatus.

Next, argon gas is introduced into the chamber, and the pressure in the chamber is kept in the range of from 1 to 10 mtorr. Using the argon gas, the target of aluminium oxide is sputtered by applying radio frequency power (hereinafter, this is called R.F. power, and its frequency was selected to be 13.56 MHz) into the chamber. The protective layer 2 was formed on the substrate 1.

The power applied is in the range of from 10 w to 1 kw.

Next, in the same manner used as forming the protective layer 2, a target of an intermetallic compound $In_3SbTe_2$ and another target of an alloy $In_{50-X/2}Sb_{50-X/2}Te_X$ (where X is represented by atom % and in the range of $25 \leq X \leq 45$) is sputtered at the same time in the chamber so as to form the recording layer 3.

The each spattering rate of the respective targets in the above operations were predetermined so that the recording layer 3 had a desired composition which will be described below.

Moreover, as still another mode according to this embodiment, three pure-substance targets of indium (In), antimony (Sb) and tellurium (Te) may be sputtered at the same time because the compound and alloy are depositted on the protective layer 2 in the atomic unit.

Next, the protective layer 4 is formed in the same manner as forming the protective layer 2.

Subsequently, a target of gold (Au) is sputtered in the same condition as in the formation of the protective layer 2 in the chamber so as to form the reflecting layer 5.

Finally, the disc produced by the above process is taken out from the sputtering apparatus, then is set on a spinner. The disc is then spin-coated by an ultraviolet-curing resin and the resin is cured by irradiated ultraviolet rays so as to form the resin layer 6 on the reflecting layer 5.

Figure 2:
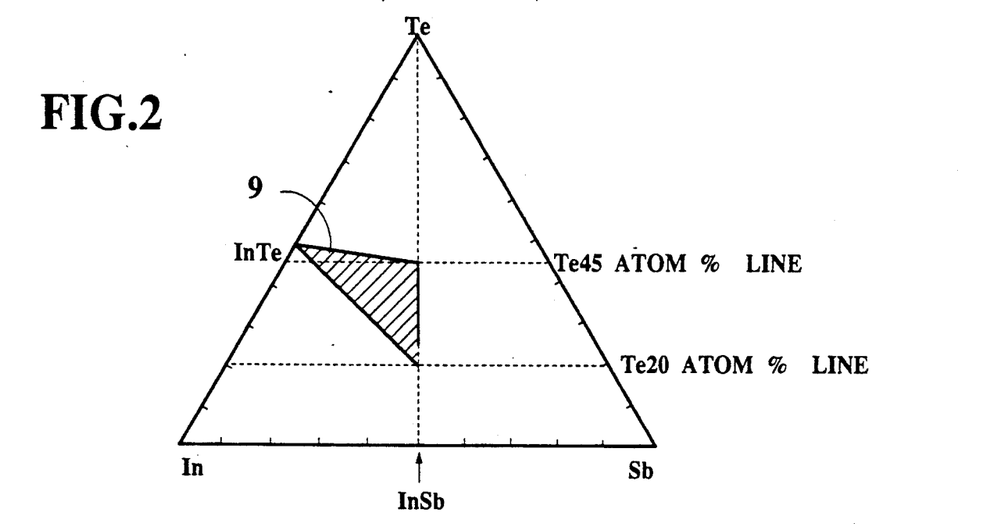
FIG. 2 is a compositional diagram of In-Sb-Te for showing a compositional range of a recording layer in the recording medium for information shown in FIG. 1.

By using such a method for producing the recording medium, 31 kinds of disc samples which were classified into Sample A group to Sample F group in a compositional range 9 of the recording layer material in the recording medium for information according to this embodiment were produced as described below and as shown in FIG. 2.

Sample A Group $\{(InSb)_{0.55/2}Te_{0.45}\}_{100-z}(InTe)_z$
z = 0, 20, 40, 60, 80, 100 atom %.

Sample B Group $\{(InSb)_{0.60/2}Te_{0.40}\}_{100-z}(InTe)_z$
z = 0, 20, 40, 60, 80 atom %.

Sample C Group $\{(InSb)_{0.65/2}Te_{0.35}\}_{100-z}(InTe)_z$
z = 0, 20, 40, 60, 80 atom %.

Sample D Group $\{(InSb)_{0.70/2}Te_{0.30}\}_{100-z}(InTe)_z$
z = 0, 20, 40, 60, 80 atom %.

Sample E Group $\{(InSb)_{0.75/2}Te_{0.25}\}_{100-z}(InTe)_z$
z = 0, 20, 40, 60, 80 atom %.

Sample F Group $\{(InSb)_{0.80/2}Te_{0.20}\}_{100-z}(InTe)_z$
z = 0, 20, 40, 60, 80 atom %.

Namely, an alloy of $In_{50-X/2}Sb_{50-X/2}Te_X$ in which X is 45 atom % was used in the Sample A group. Similarly, alloys of X=40 atom % in the Sample B group, X=35 atom % in the Sample C group, X=30 atom % in the Sample D group, X=25 atom % in the Sample E group and X=20 atom % in the Sample F were used.

Next, initialization, overwrite of information, reading-out of information and a method for evaluating reliability in reading-out of information will be explained.

Initialization of Recording Medium for Information

The recording layer 3 is initially in the amorphous state because it is quenched immediately when deposited on the substrate 1 by spattering. To provide recording marks in the amorphous phase, it is necessary to change all of the recording layer 3 into a crystalline phase. This is initialization of the recording medium.

In this embodiment, disc samples produced by the method as mentioned above were rotated at 1800 r.p.m., then a laser beam which has power of 14 mW at the surface of the recording layer and is emitted continuously was irradiated onto a predetermined spiral track in the recording layer so as to carry out the initialization.

Since the amorphous phase formed on the substrate 1 by spattering is thermally very stable, the power of the laser beam for recording is particularly required to be so large that it is 14 mW. Moreover, to completely carry out the initialization of the recording layer, the track was irradiated by the laser beam three times.

Overwrite of Information

After completing the initialization, a phase pattern is formed in which amorphous phases and crystalline phases are arranged alternately at predetermined intervals along the track. This formation of the phase pattern is the overwrite of information.

Figure 3:
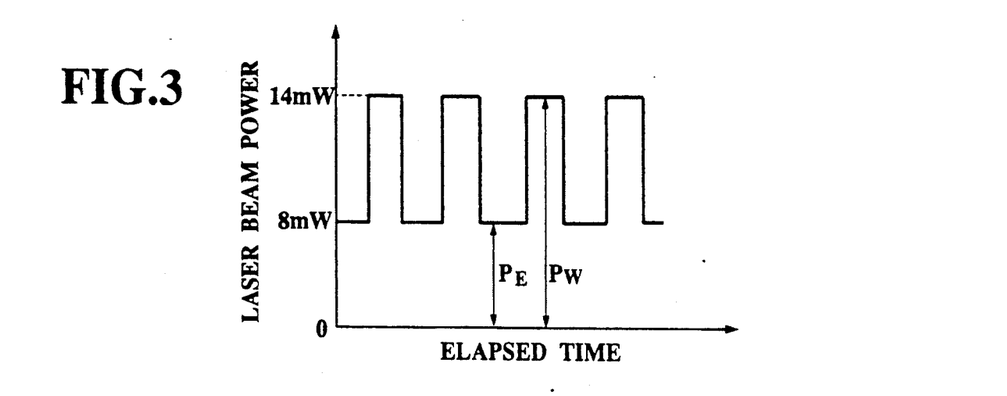
FIG. 3 is an explanatory diagram with respect to a pattern of beam power for showing changeover between a laser beam for erasing and a laser beam for recording alternately.

In this embodiment, as shown in FIG. 3, a laser beam for recording having the highest power $P_W$ of 14 mW and another laser beam for erasing having power $P_E$ of 8 mW were used. Namely, laser beams switched at a period obtained as an inverse number of a frequency of 4 MHz or 5 MHz, i.e., a period of 250 ns (nanoseconds) or 200 ns were irradiated onto the track of the recording layer rotated at 1800 r.p.m. so as to carry out the overwrite alternatively.

For example, a portion irradiated by the laser beam of a recording power level is changed into an amorphous phase so as to form recording marks. Then, when the laser power level is changed to an erasing power level, next portion is irradiated by the laser beam and is changed into a crystalline phase. Since the disc is rotated at a predetermined speed, the portions irradiated by the laser beam and changed into amorphous phases or crystalline phases are arranged alternately at predetermined intervals corresponding to the power level switching period of the laser beam power level. In such a manner, a phase pattern comprising an arrangement defined by arranging the amorphous phases and crystalline phases alternately is formed.

When the first overwrite is performed, it is not necessary to use the laser beam of the erasing power level, since the recording layer is already crystallized by the initialization. The overwrite can be accomplished by irradiating the laser beam for recording intermittently.

Also, since the power levels are switched at the same interval, the duty ratio is 50%.

Moreover, the power of the laser beam for recording is generally in the range of from 12 mW to 20 mW, and the power of the laser beam for erasing is lower than that of the laser beam for recording, that is, it is in the range of from 5 mW to 12 mW.

Reading-out of Information

Information can be obtained by retrieving the phase pattern formed by the overwrite.

Namely, after completing the overwrite, the recording layer 3 rotating at the same speed as the rotation speed in the overwrite is irradiated by a laser beam for reading-out having a small irradiation energy so that the phase change of the recording layer 3 does not occur. Then, the difference in enerby intensity between the laser beams reflected at the amorphous phases and crystalline phases respectively is measured. Since the phase pattern formed by arranging the amorphous phases and crystalline phases alternately at the predetermined interval can be regarded as data in binary code system, it is possible to obtain information stored in the recording layer by measuring the energy intensity of the laser beam reflected at the recording layer. This is reading-out of information.

In this embodiment, a semiconductor laser beam having power of 0.8 mW (wavelength: 830 nm) was used as the laser beam for reading-out. Namely, the laser beam passes through the protective layers 2 through the substrate 1. And a part of the laser beam is reflected by the recording layer 3, while a remained laser beam is transmitted through the recording layer 3 and the protective layer 4 so as to be reflected at the reflecting layer 5. Then the remained laser beam is returned and transmitted through the protective layers 2, 4 and the recording layer 3 to emerge from the substrate 1 with the part of the laser beam reflected at the recording layer 3.

The reflected laser beam emerging from the substrate 1 are interfered with each other and detected by a photoelectric conversion element. The reflected and detected lights are subjected to A/D conversion and changed into a regenerative signal. Then, the frequency distribution of the regenerative signal is measured by a spectroanalyzer. The measurement is carried out for the respective disc samples of from Sample A group to Sample F group.

Since the recording layer 3 has a predetermined phase pattern with a specific cycle, phases (crystalline or amorphous) of the portions in the recording layer 3 irradiated by the laser beam is changing in a same cycle in accordance with the rotation of the disc when information in the recording layer 3 is read out. Thus, the energy intensity of the regenerative signal is changed in accordance with the changing cycle of the laser beam power because the respective reflectances of the laser beam to the phases differ from each other. In short, the regenerative signal has a constant cycle corresponding to the frequency of 4 MHz or 5 MHz.

The power level of the laser beam for reading-out is in the range of from 0.2 to 3 mW.

A Method for Evaluating Reliability in Reading-out of Information

Next, to evaluate the reliability of reading-out information recorded in the recording layers of the respective disc samples, C/N values (carrier to noise values) and erasure ratios determined by using the C/N values were measured from the frequency distribution obtained.

The C/N value means a ratio of a degree of the regenerative signal having a specific frequency (in this embodiment, it is 4 MHz or 5 MHz) to a degree of a noise comprising various frequencies, and is expressed by a logarithmic decibel unit (dB).

The erasure ratio is defined as follows.

Figure 4:
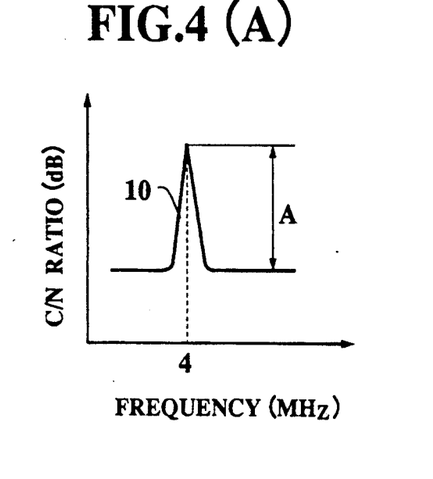
FIGS. 4(A) and 4(B) are diagrams of regenerative signals for showing erasure ratios.

A first recording is carried out by using a laser beam for recording of 4 MHz after the initialization process, and a C/N value of a regenerative signal 10 obtained as shown in FIG. 4(A) is expressed, for example by A. Then, overwrite is again carried out by using laser beams for recording and erasing of 5 MHz with a different phase pattern from that in the first recording. In this case, a C/N value of a remaining signal 11, which is a part of the regenerative signal 10 not erased completely in this process as shown in FIG. 4(B) is expressed, for example by B. The erasure ratio means a value obtained from the ratio of B-A which is a logarithmic value of the ratio of the strength of remaining signal 11 to the strength of the regenerative signal 10.

A C/N value of a regenerative signal 12 obtained in the overwrite operation by using a laser beam of 5 MHz is expressed by C as shown in FIG. 4(B). The C/N value C is also shown in FIGS. 5(A) through 5(F).

The erasure ratio B-A and the C/N value C are shown in FIGS. 5(A) through 5(F) for the respective sample groups.

We judge that it is possible to successfully carry out the reading-out of information by changing the regenerative signal into the binary state if we use a sample which originally has a C/N value of 35 dB or more and an erasure ratio of −20 dB or below and can maintain a C/N value of 35 dB or more even when it is subjected to the overwrite operations at least 1,000 times, We evaluate that such a sample is usable on a practical basis.

Namely, when the C/N value is over 35 dB, since the difference in intensity between the regenerative laser beams reflected at the crystalline phase and amorphous phase in the recording layer respectively is about 20%, it is possible to easily obtain regenerative signals having high reproductivity by A/D conversion of the laser beam reflected at the recording layer 3 and the reflecting layer 5. Moreover, when the erasure ratio is below −20 dB, the C/N value B of the remaining signal 11 can be controlled below 30 dB even when the C/N value A is 50 dB, which is the practical maximum value thereof.

Furthermore, since the overwrite operation is performed more than 1,000 times, the sample has practical application.

Hereinafter, evaluation results for the respective sample groups will be explained.

EXAMPLE 1

Figure 5:
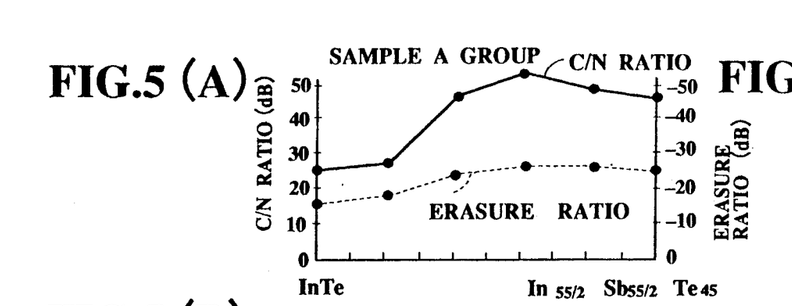
FIGS. 5(A) through 5(F) are characteristic diagrams for showing C/N values of disc samples and erasure ratios.

The result of evaluation of the characteristics in the Sample A group is shown in FIG. 5(A).

In FIG. 5(A), the right end of the lateral axis shows a composition of $In_{55/2}Sb_{55/2}Te_{45}$. The left end of the lateral axis shows a composition of InTe only. The middle of the lateral axis shows a composition of the two mixed as an alloy. The vertical axis on the left side shows the C/N value corresponding to a solid line connecting respective data, and the vertical axis on the right side shows the erasure ratio corresponding to a broken line connecting respective data.

As shown in FIG. 5(A), in a ternary alloy of $\{(InSb)_{0.55/2}Te_{0.45}\}_{100-z}(InTe)_z$, when Z is in the range of $80 \leq Z \leq 100$ atom %, the C/N value is below 35 dB, and the erasure ratio is over −20 dB. This means that it is difficult to obtain a clear regenerative signal, and that a wrong signal is likely to be picked-up.

The reason is, as described in the prior art, that a laser beam for recording of 14 mW was used in this embodiment though the power of the laser beam for recording is required to be 20 to 25 mW at the surface of the disc to change the compound of InTe to the amorphous state. Namely, though the laser beam for recording was irradiated onto the recording layer, crystalline phases were formed and the phase pattern consisting of the amorphous phases and crystalline phases was distorted. Thus, a regenerative signal based on the wrong phase pattern had a frequency different from an inverse number of the changing period in the power of the laser beam, so that the C/N value C of the regenerative signal was deteriorated. Similarly, the erasure ratio B-A was also deteriorated by degradation of the C/N value A in the regenerative signal and increase of the C/N value B corresponding to noise.

However, in a region in which the influence of the alloy of $In_{55/2}Sb_{55/2}Te_{45}$ is exerted, i.e., in a range of $0 < Z \leq 60$ atom % in the ternary alloy of $\{(InSb)_{0.55/2}Te_{0.45}\}_{100-z}(InTe)_z$, the rapid crystallizing characteristic and easy amorphous characteristic of the alloy $In_{55/2}Sb_{55/2}Te_{45}$ work effectively, and excellent C/N values and erasure ratio can be obtained. Namely, in the beginning of the overwrite operation, the C/N value is over 35 dB and the degree of erasure is below −20 dB.

Figure 6:
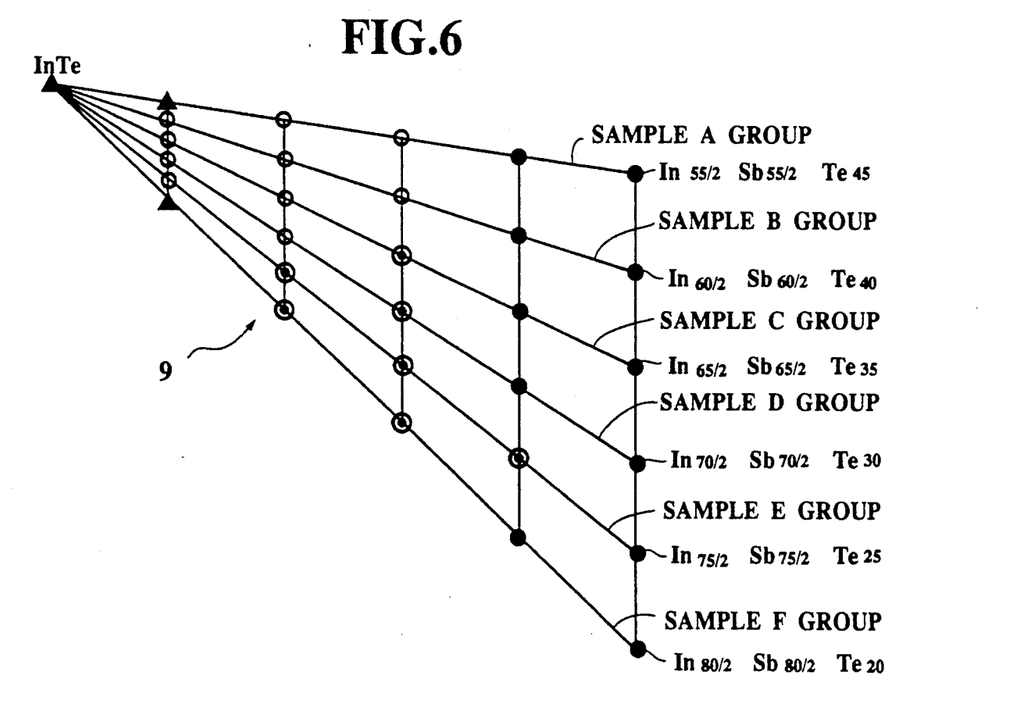
FIG. 6 is an explanatory diagram for characteristic evaluation with respect to C/N values when the overwrite operation is repeated, and extend the compositional range shown in FIG. 2.

FIG. 6 shows the results of characteristic evaluation when an overwrite operation with the frequency of 4 MHz and another overwrite operation with the frequency of 5 MHz are alternately repeated many times in cases of the Sample A group to Sample F group.

Namely, as shown in FIG. 6, the compositional region 9 of the recording layer material in the recording medium for information shown in FIG. 2 is picked up and enlarged. FIG. 6 shows results of characteristic evaluation based on the C/N values at positions corresponding to compositions of the respective 31 kinds of disc samples.

In FIG. 6, disc samples whose C/N values were kept over 45 dB even after being subjected to the overwrite operation over 100,000 times are expressed by a mark ⊚ showing that the characteristic is excellent at the compositional positions thereof. Disc samples whose C/N values were kept over 35 dB even after subjected to the overwrite operation over 100,000 times are expressed by a mark ● showing that the characteristic is fair. Moreover, disc samples whose C/N values were kept over 35 dB until being subjected to the overwrite operations 1,000 to 10,000 times are expressed by a mark showing that the characteristic is allowable. Furthermore, disc samples whose C/N values went below 35 dB at the first overwrite operation are expressed by a mark ▲ showing that the characteristic is inferior.

As shown in FIG. 6, when the value of Z is in the range of $0 \leq Z \leq 60$ atom % in the ternary alloy of $\{(InSb)_{0.55/2}Te_{0.45}\}_{100-z}(InTe)_z$ in the Sample A group, the C/N value thereof is kept over 35 dB until the overwrite operation is repeated 1,000 to 10,000 times. This shows the same result as the result shown in FIG. 5(A).

The reason why the C/N value becomes such an excellent value can be explained as follows.

Namely, in the overwrite operation, the compositionally stable compound InTe is included in the alloy $In_{50-x/2}Sb_{50-x/2}Te_x$ when the recording layer is quenched after melted, then crystal growth of the compound which composes the recording layer is generated between the alloys as nuclei of crystals. Thus, atomic exchange which would occur among compositionally unstable alloys can be prevented. Namely, the segregation is not seen in the recording layer.

Accordingly, when the composition of the recording layer is controlled to be the same with the composition of the ternary alloy consisting of the compound InTe and alloy $In_{0.55/2}Sb_{0.55/2}Te_{0.45}$, i.e., $\{(InSb)_{0.55/2}Te_{0.45}\}_{100-z}(InTe)_z$ (where Z is in the range of $0 < z \leq 60$ atom %), the excellent characteristics, that is, the rapid crystallizing characteristic and the easy amorphous characteristic which can not be obtained by the compound InTe only or by the alloy $In_{0.55/2}Sb_{0.55/2}Te_{0.45}$ can only be obtained stably even when the overwrite operation is repeated.

Accordingly, in the range of said composition, clear regenerative signals can be practically obtained without picking up wrong signals even when the overwrite operation is repeated many times.

EXAMPLE 2

FIG. 5(B) shows the results of the characteristic evaluation with respect to the Sample B group in which the alloy $In_{55/2}Sb_{55/2}Te_{45}$ shown in FIG. 5(A) is replaced by the alloy $In_{60/2}Sb_{60/2}Te_{40}$.

As shown in FIG. 5(B), in a region in which the influence of the alloy of $In_{60/2}Sb_{60/2}Te_{40}$ appears, i.e., in a range of $0 < z \leq 80$ atom % in the ternary alloy of $\{(InSb)_{0.60/2}Te_{0.40}\}_{100-z}(InTe)_z$, the rapid crystallizing characteristic and the easy amorphous characteristic of the alloy $In_{60/2}Sb_{60/2}Te_{40}$ work effectively, and the C/N values are over 35 dB and the erasure ratios are below −20 dB at the beginning of the overwrite operation, as well as the description in Example 1.

The results of the characteristic evaluation in Sample B group after repeating the overwrite operation many times are shown in FIG. 6 in the same manner as in Example 1.

As shown in FIG. 6, when Z is in the range of $0 < z \leq 80$ atom % in the ternary alloy of $\{(InSb)_{0.60/2}Te_{0.40}\}_{100-z}(InTe)_z$ of the Sample B group, the C/N value is kept over 35 dB until the overwrite is repeated 1000 to 10,000 times.

This is the same result as the result shown in FIG. 5(B).

Accordingly, when the composition of the recording layer is controlled to be the same with the composition of the ternary alloy consisting of the compound InTe and alloy $In_{0.60/2}Sb_{0.60/2}Te_{0.40}$, i.e., $\{(InSb)_{0.60/2}Te_{0.40}\}_{100-z}(InTe)_z$ (where Z is in the range of $0 < z \leq 80$ atom %), the rapid crystallizing characteristic and the easy amorphous characteristic can be obtained similarly to Example 1.

Accordingly, in the range of said composition, clear regenerative signals can be practically obtained without picking up wrong signals even when the overwrite operation is repeated many times.

EXAMPLE 3

FIG. 5(C) shows the results of the characteristic evaluation with respect to the Sample C group in which the alloy $In_{55/2}Sb_{55/2}Te_{45}$ shown in FIG. 5(A) is replaced by the alloy $In_{65/2}Sb_{65/2}Te_{35}$.

As shown in FIG. 5(C), in a region in which the influence of the alloy of $In_{65/2}Sb_{65/2}Te_{35}$ appears, i.e., in a range of $0 < z \leq 60$ atom % in the ternary alloy of $\{(InSb)_{0.65/2}Te_{0.35}\}_{100-z}(InTe)_z$, the rapid crystallizing characteristic and the easy amorphous characteristic of the alloy $In_{60/2}Sb_{60/2}Te_{40}$ work effectively, and the C/N values are over 35 dB and the erasure ratios are below $-20$ dB at the beginning of the overwrite operation, as well as the description in Example 1.

The results of the characteristic evaluation in Sample C group after repeating the overwrite operation many times are shown in FIG. 6 in the same manner as in Example 1.

As shown in FIG. 6, when Z is in the range of $0 < z \leq 80$ atom % in the ternary alloy of $\{(InSb)_{0.65/2}Te_{0.35}\}_{100-z}(InTe)_z$ of the Sample C group, the C/N value is kept over 35 dB until the overwrite is repeated 1,000 to 10,000 times.

Accordingly, when the composition of the recording layer is controlled to be the same with the composition of the ternary alloy consisting of the compound InTe and alloy $In_{0.65/2}Sb_{0.65/2}Te_{0.35}$, i.e., $\{(InSb)_{0.65/2}Te_{0.35}\}_{100-z}(InTe)_z$ (where Z is in the range of $0 < \leq 60$ atom %), the rapid crystallizing characteristic and the easy amorphous characteristic can be obtained similarly to Example 1.

Accordingly, in the range of said composition, clear regenerative signals can be practically obtained without picking up wrong signals even when the overwrite operation is repeated many times.

In particular, since the C/N value of the ternary alloy formed of a compositional range in which InTe is contained 40 atom % is kept over 45 dB even when the overwrite operation is repeated over 100,000 times, very clear regenerative signals can be obtained when a disc consisting of the ternary alloy having said compositional range is used as a material of the phase change type recording layer.

EXAMPLE 4

FIG. 5(D) shows the results of the characteristic evaluation with respect to the Sample D group in which the alloy $In_{55/2}Sb_{55/2}Te_{45}$ shown in FIG. 5(A) is replaced by the alloy $In_{70/2}Sb_{70/2}Te_{30}$.

As shown in FIG. 5(D), in a region in which the influence of the alloy of $In_{70/2}Sb_{70/2}Te_{30}$ appears, i.e., in a range of $0 < Z \leq 80$ atom % in the ternary alloy of $\{(InSb)_{0.70/2}Te_{0.30}\}_{100-z}(InTe)_z$, the rapid crystallizing characteristic and the easy amorphous characteristic of the alloy $In_{60/2}Sb_{60/2}Te_{40}$ work effectively, and the C/N values are over 35 dB and the erasure ratios are below $-20$ dB at the beginning of the overwrite operation, as well as the description in Example 1.

The results of the characteristic evaluation in Sample D group after repeating the overwrite operation many times are shown in FIG. 6 in the same manner as in Example 1.

As shown in FIG. 6, when Z is in the range of $0 < Z \leq 80$ atom % in the ternary alloy of $\{(InSb)_{0.70/2}Te_{0.30}\}_{100-z}(InTe)_z$ of the Sample D group, the C/N value is kept over 35 dB until the overwrite is repeated 1,000 to 10,000 times.

This is the same result as the result shown in FIG. 5(D).

Accordingly, when the composition of the recording layer is controlled to be the same with the composition of the ternary alloy consisting of the compound InTe and alloy $In_{0.70/2}Sb_{0.70/2}Te_{0.30}$, i.e., $\{(InSb)_{0.70/2}Te_{0.30}\}_{100-z}(InTe)_z$ (where Z is in the range of $8 < Z \leq 80$ atom %), the rapid crystallizing characteristic and the easy amorphous characteristic can be obtained similarly to Example 1.

Accordingly, in the range of said composition, clear regenerative signals can be practically obtained without picking up wrong signals even when the overwrite operation is repeated many times.

In particular, since the C/N value of the ternary alloy formed of a compositional range in which InTe is contained 40 atom % is kept over 45 dB even when the overwrite operation is repeated over 100,000 times, very clear regenerative signals can be obtained when a disc consisting of the ternary alloy having said compositional range is used as a material of the phase change type recording layer.

EXAMPLE 5

FIG. 5(E) shows the results of the characteristic evaluation with respect to the Sample E group in which the alloy $In_{55/2}Sb_{55/2}Te_{45}$ shown in FIG. 5(A) is replaced by the alloy $In_{75/2}Sb_{75/2}Te_{25}$.

As shown in FIG. 5(E), in a region in which the influence of the alloy of $In_{75/2}Sb_{75/2}Te_{25}$ appears, i.e., in a range of $0 \leq Z \leq 60$ atom % in the ternary alloy of $\{(InSb)_{0.75/2}Te_{0.25}\}_{100-z}(InTe)_z$, the rapid crystallizing characteristic and the easy amorphous characteristic of the alloy $In_{60/2}Sb_{60/2}Te_{40}$ work effectively, and the C/N values are over 35 dB and the erasure ratios are below $-20$ dB at the beginning of the overwrite operation, as well as the description in Example 1.

The results of the characteristic evaluation in Sample E group after repeating the overwrite operation many times are shown in FIG. 6 in the same manner as in Example 1.

As shown in FIG. 6, when Z is in the range of $0 < Z \leq 80$ atom % in the ternary alloy of $\{(InSb)_{0.75/2}Te_{0.25}\}_{100-z}(InTe)_z$ of the Sample E group, the C/N value is kept over 35 dB until the overwrite is repeated 1,000 to 10,000 times.

Accordingly, when the composition of the recording layer is controlled to be the same with the composition of the ternary alloy consisting of the compound InTe and alloy $In_{0.75/2}Sb_{0.75/2}Te_{0.35}$, i.e., $\{(InSb)_{0.75/2}Te_{0.35}\}_{100-z}(InTe)_z$ (where Z is in the range of $0 < Z \leq 60$ atom %), the rapid crystallizing characteristic and the easy amorphous characteristic can be obtained similarly to Example 1.

Accordingly, in the range of said composition, clear regenerative signals can be practically obtained without picking up wrong signals even when the overwrite operation is repeated many times.

In particular, since the C/N value of the ternary alloy formed of a compositional range in which InTe is contained 20 to 60 atom % is kept over 45 dB even when the overwrite operation is repeated over 100,000 times, very clear regenerative signals can be obtained when a disc consisting of the ternary alloy having said compositional range is used as a material of the phase change type recording layer.

EXAMPLE 6

FIG. 5(F) shows the results of the characteristic evaluation with respect to the Sample F group in which the alloy $In_{55/2}Sb_{55/2}Te_{45}$ shown in FIG. 5(A) is replaced by the alloy $In_{80/2}Sb_{80/2}Te_{20}$.

As shown in FIG. 5(F), in a region in which the influence of the alloy of $In_{80/2}Te_{20}$ appears, i.e., in a range of $0<Z\leq 60$ atom % in the ternary alloy of $\{(InSb)_{0.80/2}Te_{0.20}\}_{100-Z}$, the rapid crystallizing characteristic and the easy amorphous characteristic of the alloy $In_{60/2}Sb_{60/2}Te_{40}$ work effectively, and the C/N values are over 35 dB and the erasure ratios are below $-20$ dB at the beginning of the overwrite operation, as well as the description in Example 1.

The results of the characteristic evaluation in Sample F group after repeating the overwrite operation many times are shown in FIG. 6 in the same manner as in Example 1.

As shown in FIG. 6, when Z is in the range of $0<Z\leq 60$ atom % in the ternary alloy of $\{(InSb)_{0.80/2}Te_{0.20}\}_{100-Z}(InTe)_Z$ of the Sample F group, the C/N value is kept over 35 dB until the overwrite is repeated 1,000 to 10,000 times.

This is the same result as the result shown in FIG. 5(F).

Accordingly, when the composition of the recording layer is controlled to be the same with the composition of the ternary alloy consisting of the compound InTe and alloy $In_{0.80/2}Sb_{0.80/2}Te_{0.20}$, i.e., $\{(InSb)_{0.80/2}Te_{0.20}\}_{100-Z}(InTe)_Z$ (where Z is in the range of $0<Z\leq 60$ atom %), the rapid crystallizing characteristic and the easy amorphous characteristic can be obtained similarly to Example 1.

Accordingly, in the range of said composition, clear regenerative signals can be practically obtained without picking up wrong signals even when the overwrite operation is repeated many times.

In particular, since the C/N value of the ternary alloy formed of a compositional range in which Inte is contained 40 to 60 atom % is kept over 45 dB even when the overwrite operation is repeated over 100,000 times, very clear regenerative signals can be obtained when a disc consisting of the ternary alloy having said compositional range is used as a material of the phase change type recording layer.

As described above, through the protective layer 2 and the resin layer 6 were provided in the recording medium for information in this embodiment, these are not necessarily required therein.

Moreover, in this embodiment, though the power pattern of the laser beam used a duty ratio 50% as shown in FIG. 3, and was formed by changing the power of the laser beam at the frequency of 4 MHz or 5 MHz and the laser beam was irradiated onto the recording layer 3 for the characteristic evaluation of the recording medium for information, the frequency of changing the power of the laser beam and the power pattern are not limited to those mentioned above, and it is possible to change them freely, and the duty ratio can be also varied.

It should be clearly understood that the present invention is not limited to the above embodiment, and can be embodied in suitable modes by suitable design modifications.

What is claimed is:

1. Recording medium for recording information comprising:
   a substrate; and
   a reversible recording layer on the substrate that exists in a crystalline phase or an amorphous phase depending on the irradiation energy of a light beam irradiated on said recording layer, said layer comprising a ternary alloy that contains compositionally stable InTe and $In_{(100-x)/2}Sb_{(100-x)/2}Te_x$ where $20\leq X\leq 45$ atom %, the amount of InTe ranging from above 0 atom % to 60 atom %.

2. A recording medium as claimed in claim 1, wherein the recording layer consists of the recited ternary alloy.

3. A recording medium according to claim 2, additionally comprising a thermally stable protective layer between the recording layer and the substrate.

4. A recording medium according to claim 3, additionally comprising a reflecting layer on the recording layer.

5. A recording medium according to claim 4, additionally comprising a second protective layer between the reversible recording layer and the reflecting layer.

6. A recording medium according to claim 3, additionally comprising a second protective layer on the reversible recording layer.

7. A recording medium as claimed in claim 2, comprising crystalline regions and amorphous regions arranged in a phase pattern in the recording layer, the phase pattern representing recorded information.

8. A recording medium according to claim 1, wherein the compositionally stable is contained in an amount of between about 20 and 60 atom %.

* * * * *